United States Patent [19]

Bright et al.

[11] Patent Number: 5,618,867

[45] Date of Patent: Apr. 8, 1997

[54] HYDROXY-TERMINATED AROMATIC OLIGOMERIC PHOSPHATE AS ADDITIVE FLAME RETARDANT IN POLYCARBONATE RESIN COMPOSITION

[75] Inventors: Danielle A. Bright, New City; Paul Y. Moy, Fishkill, both of N.Y.

[73] Assignee: Akzo Nobel NV, Arnhem, Netherlands

[21] Appl. No.: 510,685

[22] Filed: Aug. 3, 1995

Related U.S. Application Data

[63] Continuation-in-part of Ser. No. 350,597, Dec. 7, 1994, abandoned.

[51] Int. Cl.⁶ .................................................. C08K 5/523
[52] U.S. Cl. .............................................. 524/127; 524/141
[58] Field of Search ..................................... 524/141, 127

[56] References Cited

U.S. PATENT DOCUMENTS

| | | | |
|---|---|---|---|
| 3,076,011 | 1/1963 | Hamermesh et al. | 260/461 |
| 3,442,827 | 5/1969 | Friedman | 260/2.5 |
| 3,562,743 | 2/1971 | Harris et al. | 260/982 |
| 3,639,545 | 2/1972 | Wilcox | 260/971 |
| 3,764,640 | 10/1973 | Klose | 260/978 |
| 3,767,732 | 10/1973 | Klose | 260/928 |
| 3,850,859 | 11/1974 | Wortmann et al. | 260/2.5 AJ |
| 3,945,954 | 3/1976 | Batorewicz | 260/2.5 AR |
| 4,463,130 | 7/1984 | Serini et al. | 525/67 |
| 4,594,364 | 6/1986 | Pawloski et al. | 521/85 |
| 5,122,556 | 6/1992 | Kambour | 524/141 |
| 5,204,394 | 4/1993 | Gosens et al. | 524/125 |
| 5,278,212 | 1/1994 | Nishihara et al. | 524/141 |

FOREIGN PATENT DOCUMENTS

| | | | |
|---|---|---|---|
| 223158 | 9/1989 | Japan | C08L 71/04 |
| 5-209086 | 8/1993 | Japan . | |

OTHER PUBLICATIONS

Chemical Abstracts, vol. 120, 9796f (1994). abstracting Japanese Patent Publication No. 05/209,086.

*Primary Examiner*—Veronica P. Hoke
*Attorney, Agent, or Firm*—Richard P. Fennelly; Louis A. Morris

[57] ABSTRACT

The present application relates to a flame retarded polycarbonate resin composition containing for flame retardancy a hydroxy-terminated aromatic oligomeric phosphate composition of the formula:

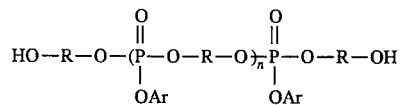

where R is a hydrocarbyl group derived from an aliphatic or aromatic diol, Ar is an alkyl-substituted or unsubstituted phenyl group, n is from about 0 to about 10, and the phosphate composition contains a predominant amount of phosphate where n ranges from 0 to 1.

4 Claims, No Drawings

HYDROXY-TERMINATED AROMATIC OLIGOMERIC PHOSPHATE AS ADDITIVE FLAME RETARDANT IN POLYCARBONATE RESIN COMPOSITION

This is a continuation-in-part of U.S. Ser. No. 08/350,597, filed Dec. 7, 1994, now abandoned.

BACKGROUND OF THE INVENTION

Aromatic oligomeric phosphate compositions which are not hydroxy-terminated are known to persons of ordinary skill in the art with representative examples being described in European Patent Publication Nos. 509,506 and 521,628 and Japanese Patent Publication No. 227,632/1988.

A hydroxy-terminated aromatic oligomeric phosphate is depicted as one of the products formed by the processes described in Japanese Patent Publication No. 223,158/1989. The product that is desired is a mixture of 22%–65%, by weight, of a reactive, hydroxy-terminated monophosphate ester, 15%–30% of a non-reactive, no-hydroxy-terminated phosphate ester, and 5%–63% Of the hydroxy-terminated oligomeric phosphate ester. This patent document teaches the use of such a mixture to flame retard phenolic resin.

Aromatic oligomeric phosphate compounds which are devoid of hydroxy termination are taught as flame retardants for polycarbonate resins in U.S. Pat. No. 5,204,394 to J.C. Gosens et al. Blends of tetra(lower alkaryl) p-phenylene diphosphate compounds and polycarbonate resin are disclosed in U.S. Pat. No. 5,122,556 to R.P. Kambour.

U.S. Pat. No. 4,463,130 to V. Serini et al. teaches flame-resistant polycarbonate resin-containing mixtures comprising a branched polyphosphate which can contain hydroxy functionality linked to the phosphorus atom of the phosphate moiety.

U.S. Pat. No. 5,278,212 to H. Nishihara et al. discloses the use of certain hydroxyphenyl-containing organophosphorus compounds as a flow modifier additive in thermoplastic resin compositions. The compounds represented by formula I at Col. 2, lines 35–45 of this patent contain only one hydroxy group when n is either 0 or 1 (see Col. 2, lines 57–58).

SUMMARY OF THE INVENTION

The present application relates to a flame retarded polycarbonate resin composition which comprises a polycarbonate resin substrate containing an effective amount (e.g., preferably from about 5% to about 15%, by weight of the resin substrate) for flame retardancy of a hydroxy-terminated aromatic oligomeric phosphate composition of the formula:

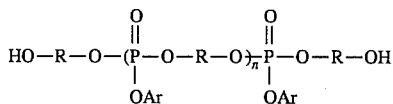

where R is a hydrocarbyl group derived from an aliphatic or aromatic diol, Ar is an alkyl-substituted or unsubstituted phenyl group, n is from about 0 to about 10, and the phosphate composition contains a predominant amount of phosphate where n ranges from 0 to 1.

DESCRIPTION OF PREFERRED EMBODIMENTS

The polycarbonate resin substrate which can be used in practice of the present invention can be any polycarbonate resin known to persons of ordinary skill in the art, including those which comprise polycarbonate and either a styrene-containing copolymer or graft copolymer (hereinafter referred to as "PC/ABS")

The hydroxy-terminated aromatic oligomeric phosphate flame retardant additive composition which is suitable for use in regard to the present invention is of the formula:

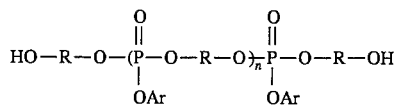

where R is a hydrocathyl group, such as phenyl, biphenyl, 4,4'-isopropylidenediphenyl, and the like, derived from an aliphatic or aromatic diol, Ar is either an alkyl-substituted or unsubstituted phenyl and n can range from about 0 to about 10 and be either an integer, in the case of the pure compositions, or a decimal number in case of mixtures thereof. Unlike the materials suggested for use by the Nishihara patent, described above, the instant phosphate composition contains a predominant amount of phosphate species where n in the above formula is from 0 to 1. The term "predominant" as used herein is intended to mean that those species where n is from 0 to 1 are present in larger amount than the other individual phosphate species where n is 2 or greater.

The amount of this phosphate flame retardant additive composition which can be used in the polycarbonate resins at a minimum level of about 4%, by weight of the resin and, preferably, can range from about 5% to about 15%. Other additives, including additional flame retardant additives, can be used as would be recognized by the person of ordinary skill in the art.

The present invention is further illustrated by the Examples which follow.

EXAMPLE 1

To 1403 g (6.65 miles) of monophenyl dichlorophosphate was added 3.5 g of magnesium chloride and 366 g of resorcinol. The reaction mixture was heated with stirring to 110° C. over thirty minutes and kept at this temperature for an additional two hours. At the end of this time all the hydroxy groups were reacted. The reaction mixture was cooled to 50° C. and an additional 750 g (6.82 moles) of resorcinol was added to the reaction mixture. The temperature was increased to 110° C., and the mixture became dark purple. The temperature was gradually increased to 150° C. over six hours and was kept there for an additional two hours. At the end, the reaction mixture was orange. It was cooled to 70° C. and was washed twice with a 5% sodium carbonate solution and three times with water.

After removal of traces of water at 80° C. under vacuum, there was left 1380.5 g of an extremely viscous orange oil that did not flow at room temperature. The percent yield was 82%. The material had the following composition where the species where n ranges from 0 to 1 constitute 51% of the entire composition:

$P_1$-$(OH)_3$: 2%
$P_1$-$(OH)_2$: 22%;
$P_2$-$(OH)_2$: 29%;
$P_3$-$(OH)_2$: 14%;
$P_4$-$(OH)_2$: 9%
$P_5$-$(OH)_2$: 5%
$P_6$-$(OH)_2$ to $P_{10}(OH)_2$: 5%

EXAMPLES 2–3

These Examples illustrate the physical properties of a conventional PC/ABS resin and a PC/ABS resin containing the hydroxy-terminated resorcinol diphenyl phosphate ("OH-RDP") flame retardant additive formed in Example 1 which is described above.

This material was preblended with a 5/1 blend of PC/ABS and compounded to as homogeneous mixture in a twin screw extruder. The pelletized composite was then dried of moisture, and sample specimens were prepared in an injection molding apparatus for the testing of their physical properties. The results were as follows:

| Material | Tensile Strength (psi) | Tensile Elong. (%) | Flexural Strength ($10^3$ psi) | Flexural Modulus ($10^5$ psi) | Izod Impact (ft-lb/in) | UL-94 (3.2/1.6 mm) |
|---|---|---|---|---|---|---|
| PC/ABS (5/1) | 7316 | 56.6 | 9.9 | 3.51 | 6.2 | Fail/Fail |
| PC/ABS (5/1) + 10% OH—RDP | 9116 | 6.1 | 9.1 | 3.25 | 0.3 | V2/V1 5.8/10.7* |

*Average flame time.

We claim:

1. A flame retarded polycarbonate resin composition which comprises a polycarbonate resin substrate containing an effective additive amount for flame retardancy of a hydroxy-terminated aromatic oligomeric phosphate composition of the formula:

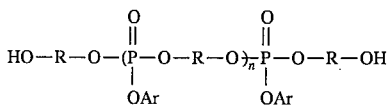

where R is a hydrocathyl group derived from an aliphatic or aromatic diol, Ar is an alkyl-substituted or unsubstituted phenyl group, n is from about 0 to about 10, and the phosphate composition contains a predominant amount of phosphate where n ranges from 0 to 1.

2. A composition as claimed in claim 1 wherein the polycarbonate resin is a polycarbonate-stryrenic resin blend.

3. A composition as claimed in claim 1 wherein the amount of phosphate composition is from about 5% to about 15%, by weight of the resin substrate.

4. A composition as claimed in claim 1 wherein the polycarbonate resin is a polycarbonate-styrenic resin blend and the amount of phosphate composition is from about 5% to about 15% by weight of the resin substrate.

* * * * *